United States Patent [19]
Carpentier

[11] Patent Number: 5,358,370
[45] Date of Patent: Oct. 25, 1994

[54] UN-WINDER FOR HAY BALES

[76] Inventor: André Carpentier, 108 Chemin Dion, Saint Élie d'Orford, Qc, Canada, J0B 2S0

[21] Appl. No.: 2,918

[22] Filed: Jan. 11, 1993

[51] Int. Cl.$^5$ .................................. A01D 90/08
[52] U.S. Cl. ................................ 414/24.6; 104/93
[58] Field of Search ............ 414/24.5, 24.6, 591, 414/911, 25; 104/93, 95; 119/16

[56] References Cited

U.S. PATENT DOCUMENTS

| | | | |
|---|---|---|---|
| 644,650 | 3/1900 | Webb | 104/93 |
| 1,321,991 | 11/1919 | De Marce | 414/25 |
| 1,531,304 | 3/1925 | Miller | 104/93 |
| 1,643,078 | 9/1927 | Maden | 414/25 |
| 1,802,550 | 4/1931 | Bennington | 104/93 |
| 2,342,015 | 2/1944 | Scheihing | 104/95 |
| 3,741,051 | 6/1973 | Brooks et al. | 83/23 |
| 3,804,272 | 4/1974 | Horne | 104/95 |
| 3,830,438 | 8/1974 | Garrison et al. | 241/283 |
| 3,968,940 | 7/1976 | Godbersen | 242/86.5 |
| 3,987,905 | 10/1976 | Dechantsreiter | 414/591 |
| 4,078,733 | 3/1978 | Popiowek | 241/200 |
| 4,163,524 | 8/1979 | Lundahn et al. | 241/30 |
| 4,266,899 | 5/1981 | Skeen | 414/24.6 |
| 4,336,732 | 6/1982 | Liet et al. | 83/109 |
| 4,396,166 | 8/1983 | Kollman | 414/911 |
| 4,396,331 | 8/1983 | Forster | 414/24.6 |
| 4,411,573 | 10/1983 | Townsend | 414/24.6 |
| 4,538,948 | 9/1985 | Melton | 414/24.6 |
| 4,552,073 | 11/1985 | Smith | 104/95 |
| 4,558,830 | 12/1985 | Larsson | 414/911 |
| 4,573,846 | 3/1986 | Willbanks et al. | 414/911 |
| 4,621,776 | 11/1986 | Hostetler | 241/101.7 |
| 4,741,656 | 5/1988 | Bishop | 414/24.6 |
| 4,789,289 | 12/1988 | Wilson | 414/24.6 |
| 4,858,752 | 8/1989 | Ballard, Jr. | 104/95 |
| 4,886,409 | 12/1989 | Penner | 414/24.6 |
| 4,968,205 | 11/1990 | Biasotto et al. | 414/24.6 |
| 5,215,278 | 6/1993 | Hess | 414/911 |

FOREIGN PATENT DOCUMENTS 2599933 12/1987 France ...................... 414/24.6

Primary Examiner—David A. Bucci
Assistant Examiner—Gregory A. Morse
Attorney, Agent, or Firm—Antoine H. Gauvin

[57] ABSTRACT

The un-winder for hay bales has a frame having a pair of opposite arms, and a link bridging the pair of arms. One of the arms is to be drivenly mounted at least in part to a roof, particularly the roof of a barn. The other arm is provided with means to unwind a bale of hay. This enables unwinding a bale of hay in a barn particularly when space for unwinding is limited using a compact self-driven suspended un-winders for hay bales.

18 Claims, 3 Drawing Sheets

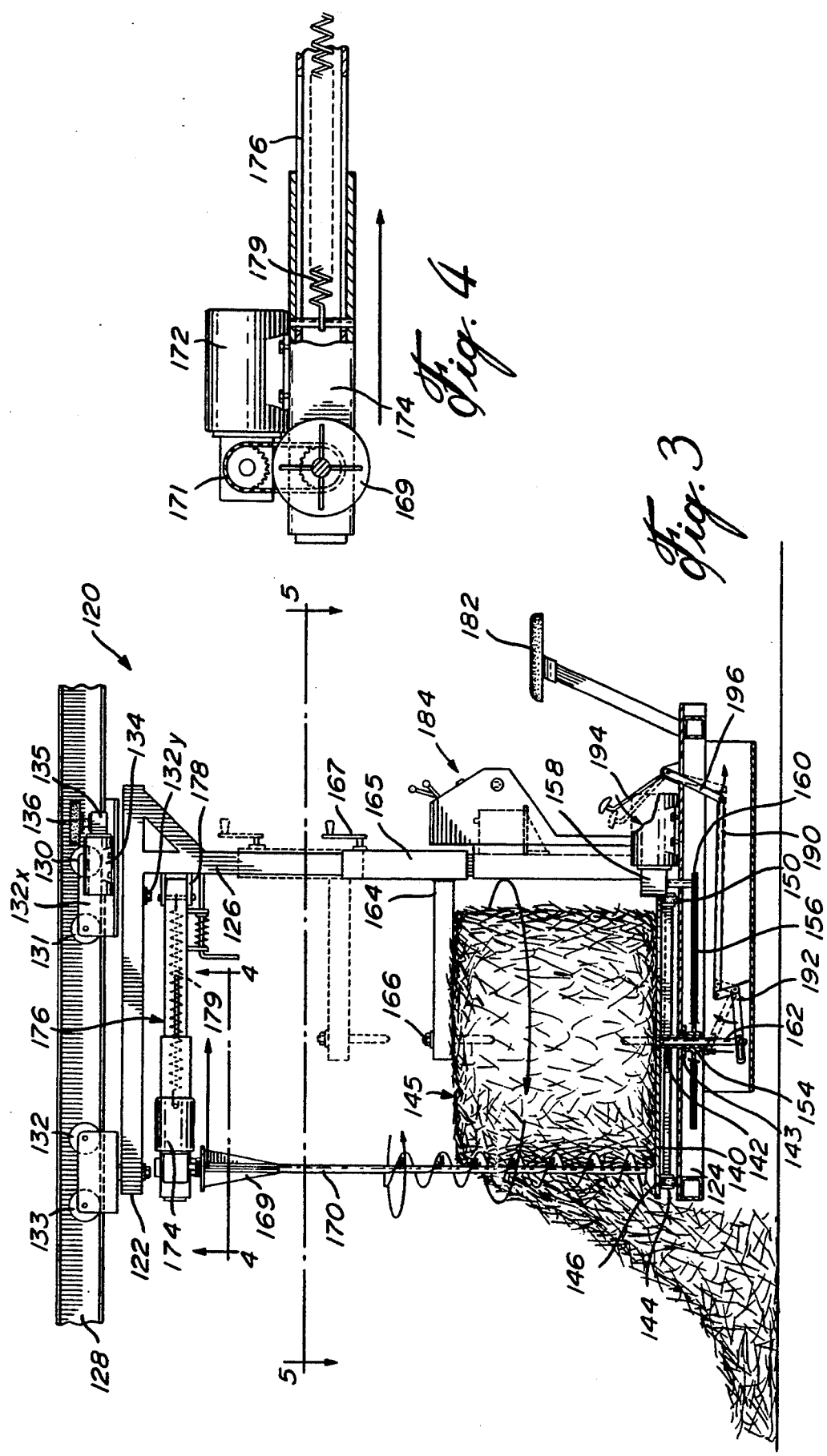

UN-WINDER FOR HAY BALES

BACKGROUND OF THE INVENTION

1. Field of the Invention

This invention relates to an un-winder for hay bales. This invention in a particular embodiment, is directed to a compact self-driven suspended un-winders for hay bales to be used in barns.

2. Description of Related Art

The prior art offers no solution for unwinding a bale of hay in a barn particularly when space for unwinding is limited.

De Marce teaches, in U.S. Pat. No. 1,321,991 dated Nov. 18, 1919, a hay spreader for barns and hay sheds having a tiltable platform.

Popiolek teaches, in U.S. Pat. No. 4,078,733 dated Mar. 14, 1978, an apparatus for separating and distributing rolled bales of agricultural material by placement between a pair of inclined endless conveyers, the apparatus being attached to a tractor.

Forster teaches in U.S. Pat. No. 4,396,331 dated Aug. 2, 1983, a bale feeding attachment for a large round bale handling machine to be pulled with a tractor.

Townsend teaches, in U.S. Pat. No. 4,411,573 dated Oct. 25, 1983, a bale handling apparatus for tractors.

Godberson teaches, in U.S. Pat. No. 3,968,940 dated Jul. 13, 1976, another bale handling apparatus for tractors.

Bishop teaches, in U.S. Pat. No. 4,741,656 dated May 3, 1988, a cylindrical bale feeder for field vehicles.

Wilson teaches in U.S. Pat. No. 4,789,289 dated Dec. 6, 1988, another bale loader handler and feeder for a trailer.

Stack feeders which are less relevant, have also been described by Brooks in U.S. Pat. No. 3,741,051 dated Jun. 26, 1973; Garrison et al. in U.S. Pat. No. 3,830,438 dated Aug. 20, 1974; Lundahl et al. in U.S. Pat. No. 4,163,524 dated Aug. 7, 1979.

Liet et al teach, in U.S. Pat. No. 4,336,732 dated Jun. 29, 1982, a device to transport a silage block.

As far as applicant is aware there is no existing simple un-winder for hay. They generally require tractors.

SUMMARY OF THE INVENTION

Broadly stated the invention is directed to an un-winder for hay bales comprising:

means to unwind a bale of hay, means to suspend said means to unwind a bale of hay, and cooperating with said means to suspend, means to displace said means to suspend and thereby said means to unwind a bale of hay.

In a preferred embodiment, the un-winder for hay bales is as defined above except that said means to suspend said means to unwind a bale of hay is at least in part positioned in a barn.

In another preferred embodiment the invention is directed to an un-winder for hay bales comprising:

a frame having a pair of opposite arms, and a link bridging said pair of arms near one of their opposite ends, one of said arms to be drivenly mounted at least in part to a roof, the other of said arms being provided with means to unwind a bale of hay.

In another preferred embodiment the un-winder for hay bales is as defined above except that said arm is motor driven, said means to unwind a bale is motor driven, and the other of said arms provided with means to unwind a bale of hay, extends beyond said link and is provided with a driver seat and means to operate from said seat, the motor of said motor driven arm and said motor of said motor driven means to unwind a bale of hay.

The invention is also directed to an un-winder for hay bales wherein said means to unwind includes a means to loosen and detach from a bale of hay, adjacent and superimposed outermost layers of hay of said bale.

DETAILED DESCRIPTION OF SOME OF THE PREFERRED EMBODIMENTS OF THE INVENTION

Referring now to the drawings which illustrate some of the preferred embodiments of the invention:

FIG. 3 is a schematic side view of another embodiment of an un-winder for hay bales with a top view of bale;

FIG. 4 is a view taken along line 4—4 of FIG. 3;

Figure 1:
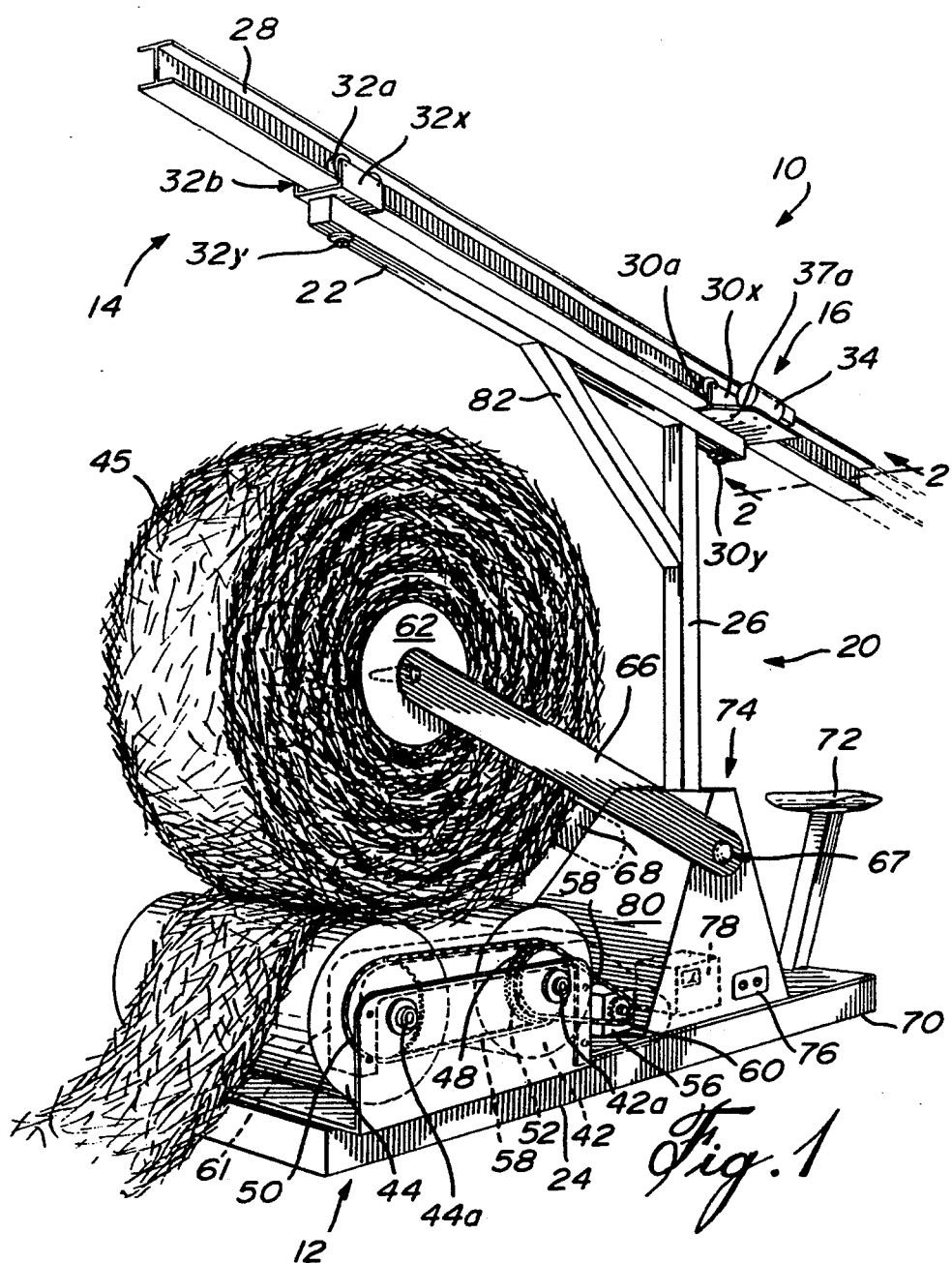
FIG. 1 is a schematic perspective view of an un-winder for hay bales.
Figure 2:
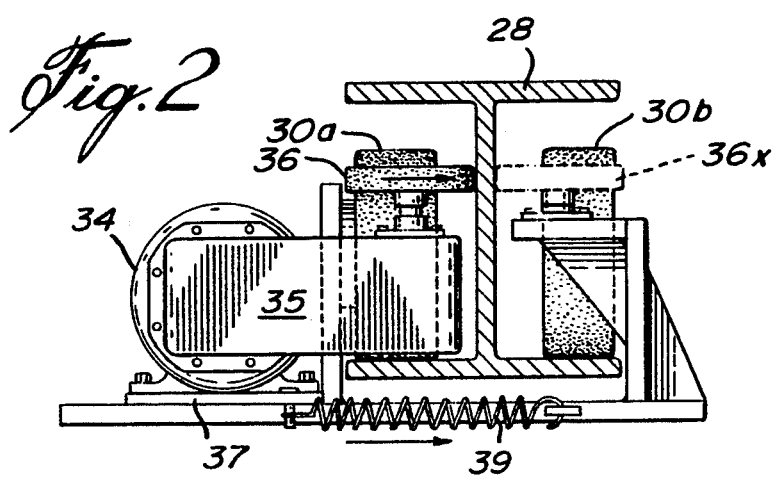
FIG. 2 is a view of the rail, wheels and motor taken along line 2—2 of FIG. 1.

Referring to FIGS. 1 and 2, an un-winder for hay bales 10 comprises:

a means 12 to unwind a bale of hay, a means 14 to suspend said means to unwind a bale of hay, and cooperating with said means to suspend, a means 16 to displace said means to suspend and thereby said means to unwind a bale of hay.

As shown in FIG. 1, in a preferred embodiment, the un-winder for hay bales comprises: a U-shaped or C-shaped frame 20 having a pair of opposite arms 22,24 and a link 26 bridging said pair of arms near one of their opposite ends. One of said arms, namely 22, is to be drivenly mounted at least in part to the roof of a barn or other areas. The other of said arms, namely 24, is provided with means to unwind a bale of hay, one of the examples being shown at 12.

One of said arms to be drivenly mounted at least in part to a roof, for instance the roof of a barn, may be obtained with a roof provided with a rail, for instance a I-shaped rail 28 and said one of said arms 22 to be drivenly mounted to a roof is provided with at least two pairs of wheels 30a, 30b, better shown in FIG. 2, and 32a, 32b and a motor 34 having at least one wheel 36 frictionally engaging said rail 28 for displacing by translation said frame 20. Preferably the motor 34 is conveniently bridged to the wheel 36 via a gear box 35 having bevel gearing or other arrangement as desired. Each of said pair of wheels has at least one wheel on each side of said I-shaped rail to sandwich said rail, for suspending and displacing said frame. The pairs of wheels 30a, 30b, 32a, 32b and the motor 34 may be directly pivotally mounted on the arm 22 or mounted on auxiliary supports 30x and 32x linked to arm 22, with pivots such as 30y, 32y. Each of the supports 30x and 32x may have two pairs of wheels as shown or more. In a preferred embodiment, the motor 34 and the gear box 35 are mounted on a motor auxiliary support 37, itself pivotally mounted about a pivot 37a secured to auxiliary support 30x. A spring 39 joins said motor auxiliary support 37 to said auxiliary support 30x and thereby said motor auxiliary support 37 turning and urging biasing of said wheel 36 against said rail 28, said spring enabling continuous contact of said wheel 36 when said rail defines tortous path. If desired a idler wheel 36 x may be used.

In a particular embodiment, the means to unwind a bale of hay comprises a pair of rollers 42, 44 for receiving thereon a bale of hay 45, The pair of rollers is motor driven, for instance the pair of rollers may be rotatably mounted via axles 42a and 44a, on bearing and provided with sprocket wheels 48, 50 for engaging a chain 58, and a sprocket wheel 52 drivenly mounted via a chain 60 to a motor 56 having a sprocket wheel. For security and in order to prevent hay to be caught in the chains 58, 60 a cover 61, shown in dotted lines for sake of clarity, encloses the chain arrangement.

Preferably, means are provided for engaging a bale of hay to rotatably hold said bale of hay against said pair of rollers bale, for instance, a pair of floating bars 66, 68, each bar having at one of its ends, one disc such as shown at 62 with respect to arm 66. The other end of the floating bars are rotatably mounted on the frame 20, such as link 26 via an axle through said link 26 and an adjustable tube 67 provided with a stopping head slidably mounted in said axle as to provide telescopic adjustment. This telescopic arrangement is provided with a locking arm threadedly mounted to hold said axle to said adjustable tube. The motor 56 may be operated in numerous ways, preferably electric, but may be substituted for diesel, gas, gasohol or gasoline operated motors if desired.

Preferably, the frame 20 at the other of said arms 24 and said link 26 further extends as at 70 and is provided with a driver seat 72 and means 74 to operate the device from said seat: i.e. the motor 56 of said pair of motor driven rollers and the motor 34 in said arm. In a preferred embodiment, the motors are battery operated, such as shown at 76. The frame may further include a battery charger 78 for said battery, if desired. A battery cover 80 may also be provided.

Also the frame includes reinforcing elements such as shown at 82 to strengthen said frame 20.

Operation

The motor 34 is first actuated to bring a bale near the location it is needed. The motor 34 is then switched off or slowed down, and the motor 56 actuated so that the pair of rollers 42, 44 unwind the bale. The motor 34 is then re-actuated to enable displacement of a layer of the bale of hay.

Other ways of carrying out the invention

The un-winder may take a plethora of forms. For instance as shown in FIG. 3, in another preferred embodiment, the un-winder for hay bales comprises: a U- or C-shaped frame 120 having a pair of opposite arms 122, 124 and a link 126 bridging said pair of arms near one of their opposite ends. One of said arms, namely 122, is to be drivenly mounted. The other of said arms, namely 124, is provided with means to unwind a bale of hay, said bale being designated as 145.

The arm to be drivenly mounted is obtained with a roof or a support provided with a I-shaped rail 128 or other shapes such as L-shaped, V-shaped, C-shaped, U-shaped, O-shaped or tubular, inverted V-shaped, and U-shaped, and the arm 122 to be drivenly mounted to a roof is provided with at least two wheels or as shown with pairs of wheels such as 130, 131, 132, 133, and the motor 134 and a gear box 135 are mounted on an auxiliary support 132x linked to arm 122, with pivot 132y. The motor 134 via gear box 135 drives a wheel 136 frictionally engaging the rail 128. In each of said pair of wheels 130,131, 132, 133, a wheel is disposed on each side of said I-shaped rail to sandwich said rail, for suspending and displacing said frame, the wheels being rotatably mounted, as described above, on auxiliary supports such as 132x.

Figure 5:
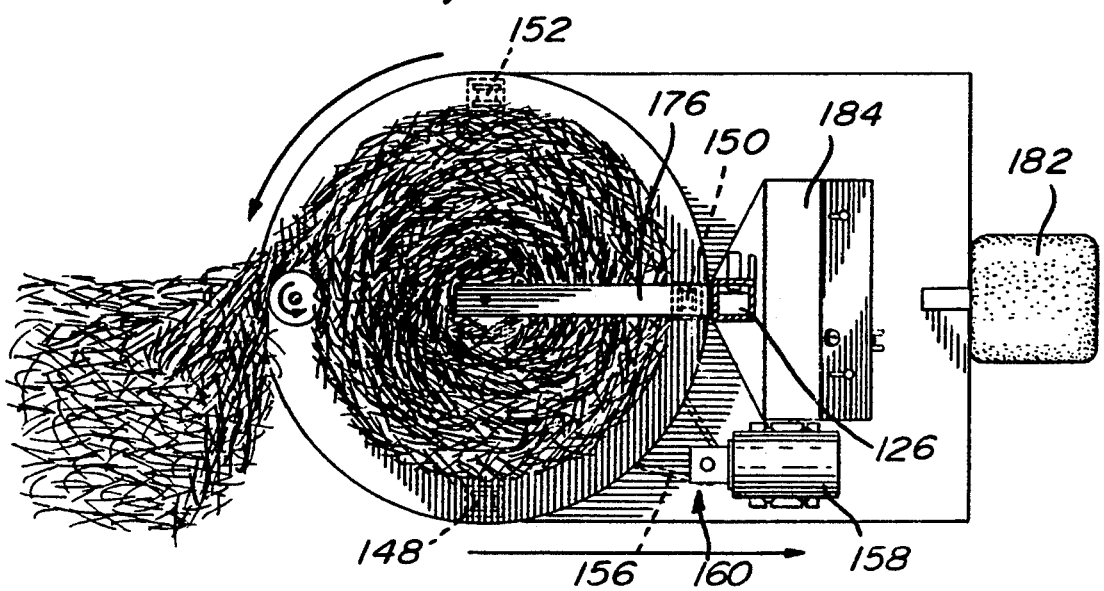
FIG. 5 is a view taken along line 5—5 of FIG. 3.

The means to unwind a bale of hay comprises a rotating base or turning table 140, for receiving thereon a bale of hay, mounted about a tubular axis 142 connected to a bearing 143 on the arm 124. The axis 142 may have also mounted thereon cross-bars 144 terminating with a roller bearing respectively 146, 148, 150 and 152 to support the base and ease its rotation or the roller bearings may be directly connected to the table 140 as shown in FIGS. 3 and 5.

Under the base and mounted thereto, is a sprocket wheel 154 driven via chain drive 156 by a motor 158 having a sprocket wheel 160. The base along its rotating axis, has an axially disposed piercing pike 162 slidably mounted inside tubular axis 142 for engaging the lower axis of a bale.

The piercing pike 162 may be operated in various ways, for instance one consists in rotatably mounting its lower end to one end of a lever 190 provided with a pivotally L-shaped element 192. The other end of the lever being rotatably bridged to a pedal 194 via a connecting rod 196 as schematically shown in FIG. 3.

On top for engaging the top of said bale, a pike's arm 164 having a piercing pike 166 connected to a carriage 165 slidable onto the link 126, such that the piercing pike 166 is axially disposed for engaging the top axis of a bale, as to sandwich said bale between said pikes, thereby stabilizing and confining said bale on said base. A handle 167 frictionally lock the carriage 165 in position.

It is to be understood that the bale may be an entity or fragmented. For instance it may be a one 4 feet long or segmented into two 2 feet. Thus the word "bale", singular, is understood to include the "bales", plural.

The means to unwind may include, to each unwinding, a means to loosen and detach from a bale of hay adjacent and superimposed outermost layers of hay of said bale. For instance, as shown in FIGS. 3 and 4, the means to loosen and detach from a bale of hay said adjacent and superimposed outermost layers of hay is a spirally grooved rod 170 mounted on chuck 169 is drivenly mounted by motor 172 provided with gear box 171 for running countermovement to that of the base 140 of the un-winder for hay bales or to that of the layer being unwound. The motor 172, the gear box and the chuck are mounted on a carriage 174 slidable onto a U-shaped supporting arm 176, itself rotatably mounted to link 126 via hinge 178. A spring 179 in said supporting arm is connected at one of its end to the carriage and at the other end to a pivot of the hinge 178, and thereby said spirally grooved rod 170 is urged said bale,or bales, to loosen and detach from a bale of hay adjacent and superimpose outermost layers of hay of said bale or bales.

A driver seat 182 and controls panel 184 adjacent thereto, containing the motors switches to operate individually from said seat, the motor at fixed or variable speeds, as desired and as is known in the art.

Operation

The motor 134 is first actuated to bring a bale near the location it is needed. The motor 134 is then switch off or slowed down, and the motors 158 and 172 actuated so that the base 140 unwind the bale. The motor 134 is then re-actuated to enable displacement of a layer of the bale of hay.

Figure 6:
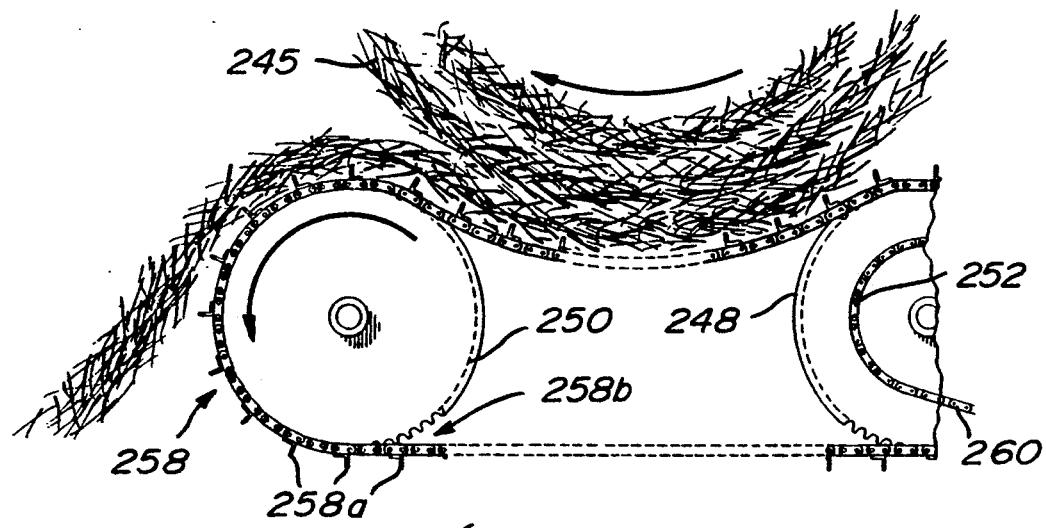
FIG. 6 is a side view of another means to unwind a bale of hay.

Instead of a pair of rollers 42, 44 provided with sprocket wheels 48, 50, 52, drivenly mounted to a motor 56 with chains 58, 60 as discussed in FIG. 1, as shown in FIG. 6, the means to unwind a bale of hay may be at least pairs of sprocket wheels 248, 250, (only one of the two sides being shown for sake of clarity) for receiving thereon a continuous conveyor belt or conveyor gripper 258 having grasping links or L-shaped links 258a to ease unwinding by biting in the bale, the conveyor having at least a pair of chains 258b to be driven by the pairs of sprocket wheels 248 and the pair of idle sprocket wheels 250. The at least a pair of sprocket wheels 248 is motor driven by at least a pair of sprocket wheels 252 and chains 260 drivenly mounted to a motor. The tension exerted on said continuous conveyor belt or conveyor gripper 258 is such as to create a curve between the pairs of sprocket wheels 248, 250 corresponding to the curvature of the hay ball 245.

As can be easily seen, this invention is directed in general to an un-winder for hay bales comprising not only U-shaped frame, but frames having various shapes: a H-shaped frame for instance. Also any means of unwinding as well as any means of suspending and displacing the means to unwind are contemplated.

In a particular embodiment 24 volts battery operated motors were successfully used to unwind 1600 lbs bales having 4 feet long using the apparatus as shown in FIG. 1. The spacing between the pair of rollers 42, 44 being about 2.5 feet. The rollers were rubber rollers. The discs of the floating bars 66, 68 such as the one shown at 62 were moving from a horizontal position to about a 45° below said position during unwinding of a bale using motors of about 0.5 H.P. (horse power) were used.

While this invention has been described in conjunction with a preferred embodiment thereof, It is clear and obvious from the above description that numerous modifications and changes therein may be made by those skilled in the art without departing from the spirit and scope of this invention as defined by the claims appended hereto.

I claim:

1. An un-winder for hay bales comprising:
   a means to unwind a bale of hay;
   a rail mounted to a barn, said barn having a roof and a floor, the rail having a length;
   a frame having a pair of opposite arms,
   one of said arms suspended from the rail such that said one of said arms is linearly translatable along the length of the rail; and an other of said arms supporting said means to unwind and
   whereby the means to unwind rotates a bale of hay such that an outermost layer of the bale is unwound from the bale.

2. The un-winder for hay bales as defined in claim 1, wherein said one of said arms is motor driven, and said motor is battery-operated.

3. The un-winder for hay bales as defined in claim 1, wherein said means to unwind consists in a pair of rollers for receiving thereon a bale of hay,
   said pair of rollers being motor driven,
   and means of engaging said bale of hay to rotatably hold said bale of hay against said pair of rollers.

4. The un-winder for hay bales as defined in claim 1, wherein said roof is provided with said rail.

5. The un-winder for hay bales as defined in claim 1, wherein said rail is a I-shaped rail, said roof is provided with said rail and said one of said arms is provided with at least two pairs of wheels pivotally mounted to said one of said arms and a battery-operated motor having a wheel frictionally engaging said rail for displacing by translation said frame,
   each of said pair of wheels consisting of a wheel on each side of said I-shaped rail so as to sandwich said rail, for suspending and displacing said frame.

6. The un-winder for hay bales as defined in claim 1, wherein said frame includes reinforcing elements for strengthening said frame.

7. The un-winder for hay bales as defined in claim 1, wherein said one of said arms is motor driven, said means to unwind a bale is motor driven, said motors are battery-operated, and the other of said arms provided with said means to unwind a bale of hay, extends and is provided with a driver seat and from said seat means to operate said motors.

8. The un-winder for hay bales as defined in claim 1, wherein said other of said arms is provided with a pair of rollers for receiving thereon a bale of hay,
   said pair of rollers being motor driven,
   and means of engaging said bale of hay to rotatably hold said bale of hay against said pair of rollers receiving a bale,
   said one of said arms is motor driven,
   said frame is U-shaped, and said U-shaped frame at said other of said arms further extending beyond said link and being provided with a driver seat and means to operate from said seat, the motor of said pair of motor driven rollers and the motor in said arm being motor driven.

9. The un-winder for hay bales as defined in claim 8, where said motors are battery operated.

10. The un-winder for hay bales as defined in claim 8, where said means of engaging said bale of hay to rotatably hold said bale of hay against said pair of rollers receiving a bale consists in a pair of arms,
    said pair of arms near one of their respective end having mounted thereon a disc as to sandwich therebetween said bale,
    said disk having axially disposed a piercing pike for engaging the axis of said bale,
    and said pair of arms, at the other of their respective end, being rotatably mounted on said frame as to enable floating of said bale on said pair of rollers receiving a bale and thereby stabilizing and confining said bale on said rollers.

11. The un-winder for hay bales as defined in claim 8, where said motors are battery operated, the batteries for operating said motors being positioned on said frame.

12. The un-winder for hay bales as defined in claim 8, where said motors are battery operated, the batteries for operating said motors being positioned on said frame, and said frame further including a battery charger for said battery.

13. The un-winder for hay bales as defined in claim 1, which includes a means to loosen and detach from a bale of hay adjacent and superimposed outermost layers of hay of said bale,
    said means to loosen being positioned between said adjacent and superimposed outermost layers.

14. The un-winder for hay bales as defined in claim 13, wherein said means to loosen and detach from a bale of hay said adjacent and superimposed outermost layers of hay is a spirally grooved rod running countermovement to that of the layer being unwound.

15. The un-winder for hay bales as defined in claim 1, wherein said means to unwind consists in a rotating base drivenly mounted, for receiving thereon a bale of hay,
    said base along its rotating axis, having axially disposed a slidable piercing pike for engaging the axis of a bale at its lowermost portion,
and on top for engaging the top of said bale slidably mounted an axially disposed piercing pike for engaging the top axis of said bale, as to sandwich said bale between said pikes, thereby stabilizing and confining said bale on said base.

16. The un-winder for hay bales as defined in claim 15, wherein said base is turning in a direction, and which further includes, slidably mounted to move to and fro the axis of said bale, a spirally grooved rod running countermovement to that of the base to loosen and detach from a bale of hay adjacent and superimposed outermost layers of hay of said bale,
    said grooved rod being positioned between adjacent and superimposed outermost layers of hay of said bale.

17. The un-winder for hay bales as defined in claim 1, where said frame is U-shaped.

18. An un-winder for hay bales comprising:
    a means for unwinding a bale of hay;
    a track disposed between a roof of a barn and a floor of the barn, the track having a length and being mounted to the barn;
    a frame having a pair of opposite arms, one of said arms supporting said means for unwinding and an other of said arms being suspended from the track such that the other of said arms is linearly translatable along the length of the track; and
    whereby the means for unwinding rotates a bale of hay such that an outermost layer of the bale is unwound from the bale and deposited on the floor of the barn.

* * * * *